United States Patent [19]

Baumgras

[11] 3,711,917

[45] Jan. 23, 1973

[54] COATED SPRING
[75] Inventor: George R. Baumgras, Downey, Calif.
[73] Assignee: North American Rockwell Corporation, El Segundo, Calif.
[22] Filed: Aug. 18, 1969
[21] Appl. No.: 850,827

[52] U.S. Cl. ............29/173, 267/166, 267/61 S, 29/426
[51] Int. Cl. ................B21f 35/00, B23p 13/00
[58] Field of Search ........29/173, 426; 267/166, 180, 267/61 S, 61 R

[56] References Cited

UNITED STATES PATENTS

| 2,058,165 | 10/1936 | McCoy | 267/61 S |
| 2,344,858 | 3/1944 | Farmer | 267/61 S |
| 2,893,789 | 7/1959 | Heinz | 267/180 |
| 2,951,109 | 8/1960 | Bollmeier | 267/180 |
| 3,449,199 | 6/1969 | Mead | 267/166 |
| 3,196,194 | 7/1965 | Ely, Jr. et al. | 264/95 |

Primary Examiner—John F. Campbell
Assistant Examiner—Donald P. Rooney
Attorney—L. Lee Humphries, Charles F. Dischler and Sidney Magnes

[57] ABSTRACT

This disclosure relates to springs that are encased in a coating of protective-material, this protective-material being of the heat-shrinkable type; so that the disclosed arrangement permit simultaneous heat-treating of the spring-material and heat-shrinking of the protective material.

4 Claims, 4 Drawing Figures

PATENTED JAN 23 1973

3,711,917

INVENTOR.
GEORGE R. BAUMGRAS
BY
Sidney Magnes

COATED SPRING

BACKGROUND

The invention described herein was made in the performance of work under a NASA contract; and is subject to the provisions of the National Aeronautics and Space Act of 1958, Public Law 85–568 (72 Stat. 426; 42 U.S.C. 2451) as amended.

It is well known that springs are widely used; and take many forms—among these forms spiral-springs, helical-springs, leaf-springs, etc. Springs, in general, have proven to be extremely reliable; and are used in many types of environments; these including chemically-hostile environments, environments exposed to extreme temperatures, etc. Use in these various environments, however, tends to impair the reliability of the springs by causing local changes such as abrasion, erosion, corrosion, fracture, and the like. Moreover, when a spring is tightly wound upon itself, its adjacent portions tend to rub against each other; this rubbing introducing a higher friction than is present when the spring is partially unwound—this rubbing leading to an undesirable mode of operation.

Many attempts have been made to overcome the above spring problems; the preferred solutions being those that coat the spring with a layer of "slippery" material such as that identified by the trade name "-Teflon"—this being one of the chemicals of the class known as tetrafluoroethylene-type of chemicals. In the past these coating materials have been applied by spraying or dipping the previously formed spring; so that the finished spring had a coating of the material. Unfortunately, the sprayed and dipped coatings tended to have non-uniform thickness; tended to have poor adhesion to the spring-material; tended to cause adherance between adjacent spring coils; and frequently trapped moisture between the spring and the inner surface of the coating. As a result, these prior-art coatings were not completely satisfactory.

OBJECT AND DRAWINGS

It is therefore an object of the present invention to provide an improved coated-spring; and the attainment of this object and others will be realized from the following detailed description of the invention, taken in conjunction with the drawing of which:

SYNOPSIS

Broadly stated, the disclosure relates to a method of producing an improved coated-spring. Basically, a spring-material is encased in a corresponding configuration of "expanded" heat-shrinkable protective-material. The combination of spring-material and encasing protective-material is then formed, as a unit, into the desired spring configuration. The next step is to heat the combination to the temperature necessary to achieve spring-temper in the spring-material; this same heat-treating also causing the expanded heat-shrinkable protective material to shrink around the spring, and to form a snug protective glove around the formed spring-material.

DESCRIPTION

Figure 1:
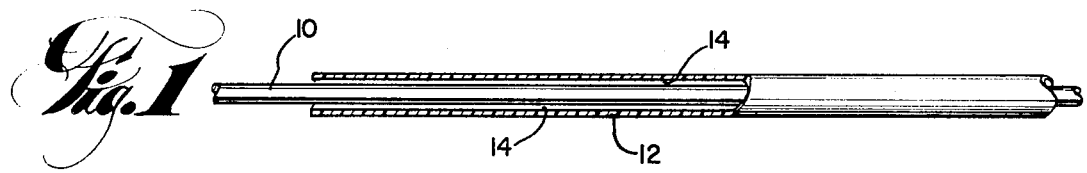
FIG. 1 shows an assembly of a spring-material and an "expanded" tube of protective-material.

The invention will be more clearly understood from FIG. 1. This shows a length of spring-material 10 that is encased in a tube of "expanded" heat-shrinkable protective material 12, leaving an annular air-volume 14. Heat-shrinkable materials of the above type are well known; and are available from a plurality of manufacturers (Rayclad Tubes Inc., Redwood City, California; Pennsylvania Fluorcarbon Co., Clifton Heights, Pennsylvania). These heat-shrinkable materials are generally a plastic that has been shaped to a desired configuration (generally tubular); and are then expanded by air pressure, and "frozen" in their expanded configuration. When the thus-expanded material is exposed to a suitable temperature, the expanded material tends to shrink to its design size, dimension, wall thickness, etc.

The heat-shrinkable material is available in many compositions; each of which has its own individual characteristics of shrinkage, temperature characteristics, slipperiness, corrosion resistance, electrical characteristics, and the like. The preferred material for the disclosed usage is of the Teflon-type, since this has a very low coefficient of friction.

The result illustrated in FIG. 1 may be achieved by assembling suitable lengths of expanded material and spring-material, or by any other suitable method. The point to be noted is that the encasing protective material has been previously expanded; and has a heat-shrinkable characteristic.

Referring again to FIG. 1, the illustrated combination of encased spring material and expanded protective-material is then formed—as a unit—by any well known means (such as winding around a mandrel, bending, etc.) to produce the desired spring configuration.

Figure 2:
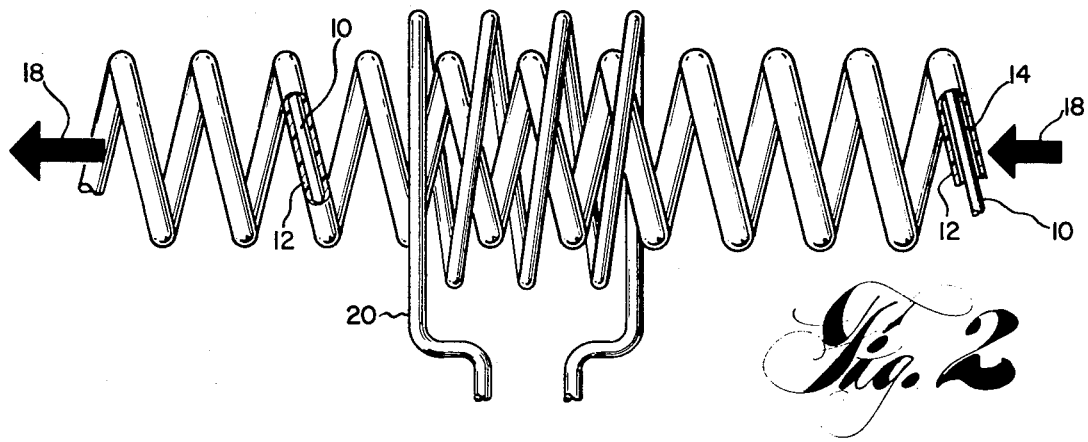
FIG. 2 shows a spiral-spring encased in a length of heat-shrinkable protective material.

FIG. 2 shows an encased helical-spring formation; and this is indicated as moving leftward—as indicated by arrow 18—and passing through a heating element indicated symbolically by a heating coil 20. It will be noted in FIG. 2 that the leftmost portion of the spring/coating assembly that has already passed through heating-coil 20 has had the protective material heat-shrunk, so that the protective material 12 fits snugly onto the spring material 10.

In contrast, the rightmost portion of the spring/coating assembly that has not yet passed through the heating area, is illustrated to show that the expanded protective-tubing 12 is still expanded, so that there is an appreciable air space 14 between the protective sheath 12 and the spring-material 10.

In this way, as the array is exposed to heat, the increased temperature achieves spring-temper, relieves the stress of the now-formed "half-hard" spring-materials; expels moisture and the like; and simultaneously shrinks the protective-material into a snugly fitting glove that encompasses the spring material.

Thus, the disclosed spring may have a glove of protective material that protects it from hostile environments, protects it from electrical contact, protects it from abrasion, results in more uniform spacing between the coils, and/or provides a low-friction surface that permits an improved quieter mode of operation.

FIG. 2 shows that the ends of the spring have been left exposed; this particular arrangement permitting the exposed end of the spring to be formed into a hook, an eye, or some other configuration suitable for the manner in which spring is to be used. Alternatively, the protective-material may extend to the ends of the spring.

It is obvious that the helical-spring arrangement of FIG. 2 is merely indicative of the various types of spring arrangements that can be used. In other words, the overall spring configuration may be a helix as illustrated, may be a spiral, may take the form of one or more leaf-springs, may take the configuration of a torsion-bar that is encased for protection, or the like. In addition, the cross-sectional shape of the spring-material itself may vary from circular, through oval, to relatively rectangular configurations.

One coated-spring produced by the disclosed process comprised 17-7 P.H. 302 stainless steel wire having a diameter of about 0.05 inches, and a Teflon coating of 0.007-inch wall thickness; and was heat-treated by raising the temperature of the assembly of formed spring wire and Teflon tubing to 700°F for half an hour. Other sizes of wire and tubing may of course be used.

It is often necessary to bend, or curve, a tube; and to do this, the tube is generally bent around a bending-form having a predetermined size, dimension, and/or radius of curvature. Unfortunately, if the tube-material happens to be soft, it is often scratched or scored by the bending form; and the resultant scratches are not only unsightly, but often act as starting-points for fractures, corrosion, and the like.

Figure 3:
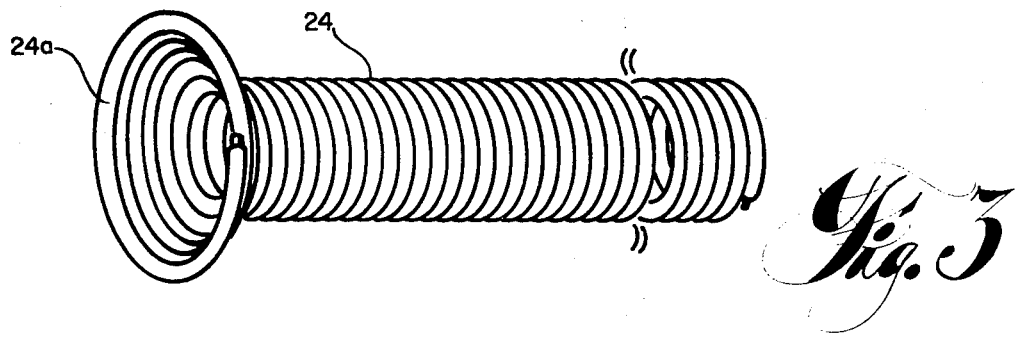
FIG. 3 shows a coated spring bender.

The disclosed invention solves this problem as follows. The spring wire used for forming bender 24 of FIG. 3 is first encased in a Teflon-type material as previously discussed; is then formed into the configuration shown in FIG. 3; and is then heat-treated as previously described—thus resulting in a tightly wound helical spring having each turn thereof encased in a snugly fitting Teflon glove.

Figure 4:
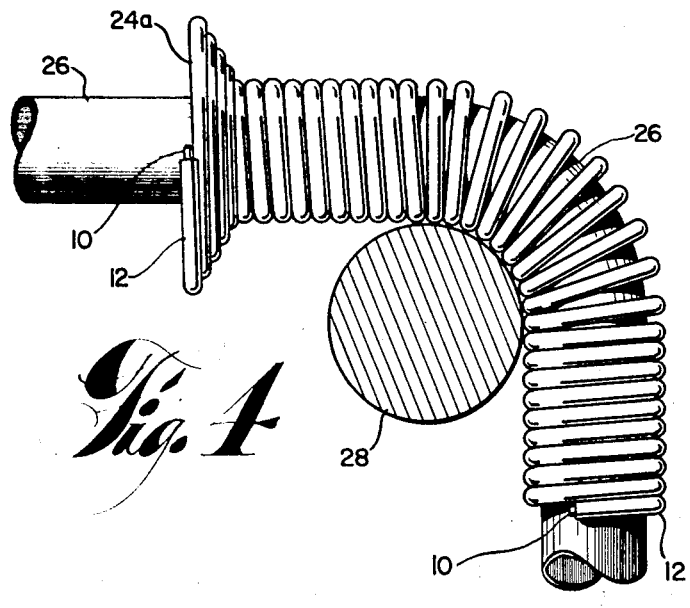
FIG. 4 shows a coated spring bender in use.

Referring now to FIG. 4, it will be seen that the soft-metal tube 26 has been inserted into the encased bender 24a; and that the combination has been bent around a bending-form 28.

It will be noted, in FIG. 4, that the individual coils of bender 24a are each covered with a protective material 12 as previously described; the protective-material being of the type that reduces the friction between adjacent coils of the bender and tubing—thus permitting tube-bending without scratching. Moreover, the slippery protective coating permits easier removal of the bender from the now bent tubing 26.

In other cases it is desirable to bend or curve a tube without collapsing its cross-sectional dimension at the point of bending; as the collapsed tube portion would restrict the flow of fluids through the tube. To achieve this result, the disclosed coated bender is inserted within the tube, and thus prevents collapsing of the tube; and still provides easy withdrawal from the now bent tubing.

I claim:

1. The process of making an encased spring comprising the steps of:
    encasing a length of spring-material in a corresponding length of expanded heat shrinkable protective-material;
    forming said combination of spring material and encasing protecting material into a desired spring configuration; and
    heating said combination of spring material and encasing protective material to a temperature that shrinks said expanded heat-shrinkable protective-material to form a snugly-fitting glove around said formed spring material.

2. The process of making an encased formed-spring comprising the steps of:
    encasing a length of spring-material in a corresponding length of expanded heat-shrinkable protective material having a substantially-uniform wall-thickness;
    forming said combination of spring-material and encasing protecting material into a desired spring-configuration; and
    heating said combination of spring-material and encasing protective material to a temperature (a) that spring-tempers said formed spring material, and (b) shrinks said expanded heat-shrinkable protective material to form—around said formed spring-material—a snug glove having a substantially uniform thickness.

3. The process of making an encased formed-spring comprising the steps of:
    encasing a length of spring-wire of the 17-7 PHO86 in a corresponding tubular length of expanded heat-shrinkable protective-material having a substantially uniform wall-thickness;
    forming said combination of spring-wire and encasing protecting material into a desired spring configuration; and
    heating said combination of formed spring-wire and encasing protective material to a temperature suitable to (a) relieve the stress of said formed spring-material, and (b) shrink said expanded heat-shrinkable protective material to form a snug glove having a substantially uniform wall-thickness around said formed spring-material.

4. The combination of claim 3 wherein said material is of the tetrafluoroethylene-type.

* * * * *